R. J. McGHEE.
DRAG SAW MACHINE.
APPLICATION FILED DEC. 22, 1908.
947,928.
Patented Feb. 1, 1910.
2 SHEETS—SHEET 1.
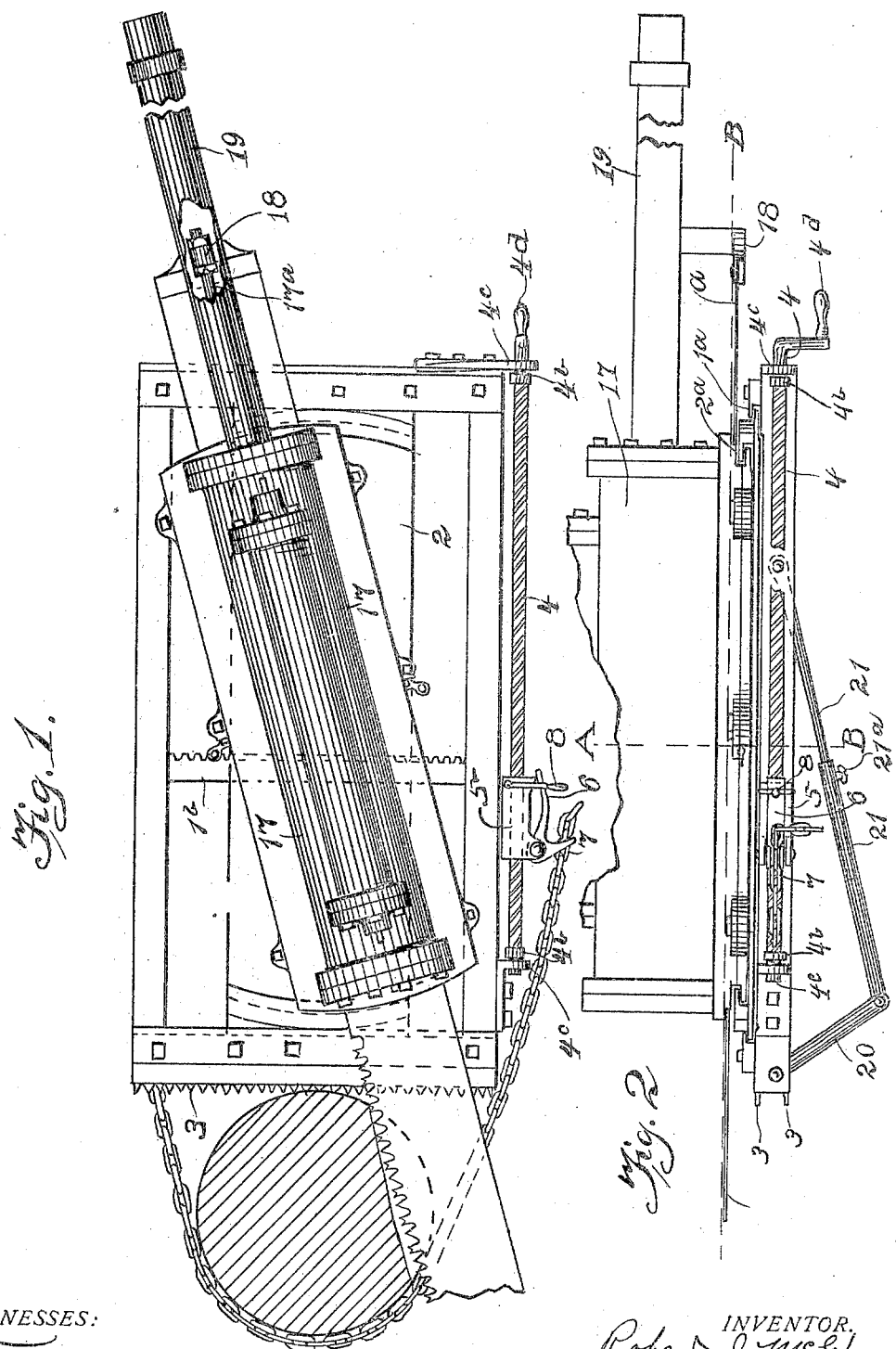
WITNESSES:
INVENTOR.
Robert J. McGhee
BY James F. Watson
ATTORNEY.

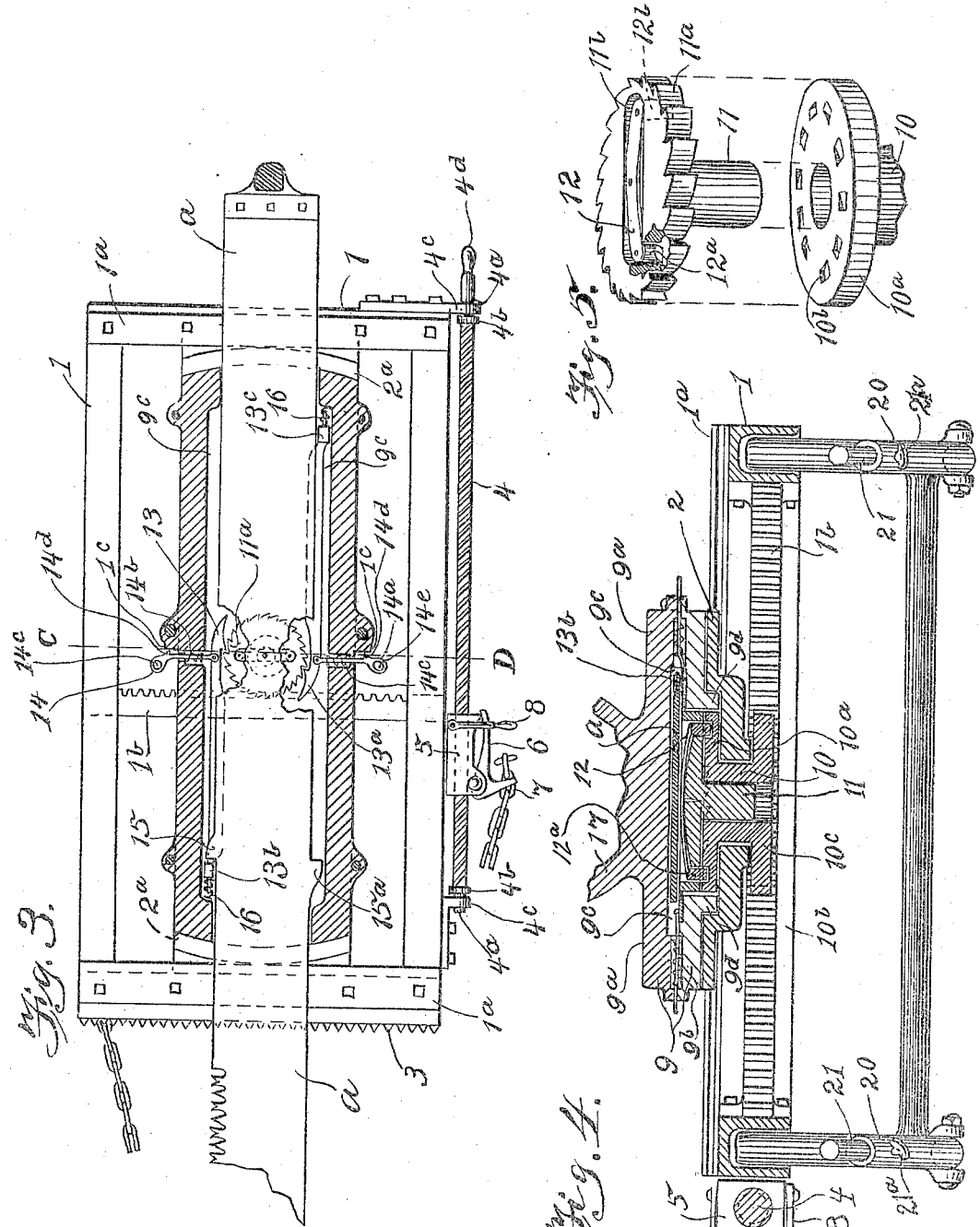

UNITED STATES PATENT OFFICE.

ROBERT J. McGHEE, OF VIRGINIA, MINNESOTA.

DRAG-SAW MACHINE.

947,928. Specification of Letters Patent. Patented Feb. 1, 1910.

Application filed December 22, 1908. Serial No. 468,877.

*To all whom it may concern:*

Be it known that I, ROBERT J. MCGHEE, a citizen of the United States, residing at Virginia, in the county of St. Louis and State of Minnesota, have invented certain new and useful Improvements in Drag-Saw Machines; and I do hereby declare the following to be a full, clear, and exact description of the invention, such as will enable others skilled in the art to which it appertains to make and use the same.

My invention relates to drag saw machines and has for its object the provision of a practicable compact and convenient drag saw machine which can be easily transported in the forests and which will be adapted to saw a standing tree close to the ground, or, if desired, at a considerable distance from the ground, and to saw into transversely divided lengths a tree or timber lying on, or approximately on the ground.

It consists of the constructions, combinations and arrangements of parts hereinafter described and claimed.

In the acompanying drawings, Figure 1, is a top plan view of my said invention, a standing tree-stump being shown as subject matter being operated upon thereby. Fig. 2 is a side elevation, partly broken away, of said invention. Fig. 3 is a horizontal sectional view of the line A—B of Fig. 2. Fig. 4 is a vertical transverse section approximately on the line C—D of Fig. 3. Fig. 5 is a detail perspective view, partly broken away, of the hereinafter described ratched feed wheels.

In the drawings, 1 is a body frame, preferably constructed of aluminum channel bars, or, if desired, of an integral casting equivalent to such bars. The ends of said body frame are provided with suitable shoulders $1^a$ adapted to engage the ends of the hereinafter described web plate. Extending longitudinally of said frame is a transversely reciprocable web plate 2, having shoulders $2^a$ $2^a$ formed thereon near each end, said shoulders being adapted in part to overhang lips extending from the lower edges of the ends of the hereinafter described engine base. At the forward end of said body frame are positioned forwardly extending teeth 3, secured to or partly embedded in said frame. Extending along one side of said frame is a screw 4, having blank ends $4^a$, upon which blank ends are secured collars $4^b$, said blank ends being mounted in suitable bearings $4^c$ extending from the side of said frame. The rearward one of said blank ends is provided with a crank-handle $4^d$ for turning the same. Mounted upon said screw, is an internally threaded carriage, 5, engaging the threads of said screw. Upon said carriage is pivoted, at its heel, a bell-crank lever 6, one end of which is cleft to engage one or another of the links of a chain 7, which chain 7 is secured at one end to the forward end of the opposite side of said frame. The opposite end of said lever 6 is adapted in operation to extend rearwardly along said carriage. A link 8 is pivoted to said sleeve near its rearward end, and is adapted in operation to engage the rearward end of said lever. Upon said web plate is mounted an oscillatable engine base 9 preferably comprising the plates $9^a$ and $9^b$, in which engine base is formed the longitudinal saw passage or tunnel $9^c$, which is transversely enlarged intermediate of its ends. Said engine base is centrally pivoted upon said web plate by means of a depending annular offset $9^d$ formed on said engine base and engaging a central recess in said web plate. Extending from said saw passage downward centrally through said web plate is a hollow spindle 10, upon the upper end of which is rigidly secured or formed a ratchet wheel $10^a$ having ratchet notches $10^b$ formed in its upper face, which wheel overhangs a portion of said web plate. Upon the lower end of said spindle is positioned a gear $10^c$, which meshes with the teeth of a rack bar $1^b$ which extends transversely of said body frame and is secured thereto. Extending into said hollow spindle is the shaft 11 of a ratchet wheel $11^a$, which ratchet wheel $11^a$ extends over the ratchet wheel $10^a$ and lies beneath the saw blade A. The upper edge of said ratchet wheel $11^a$, is radially recessed as at $11^b$, and within said recess is positioned a spring 12 extending equally on opposite sides of the center of said ratchet wheel. Upon the outer ends of said spring are positioned depending dogs $12^a$ and $12^b$ respectively which project through vertically directed apertures formed in said ratchet wheel $11^a$, and engage the ratchet notches $10^b$ formed in the upper face of said wheel $10^a$. Engaging the ratchet teeth formed on the periphery of said wheel $11^a$ at opposite sides of the axis thereof, are oppositely directed reciprocable pawls 13 and $13^a$, respectively, which pawls are adapted to reciprocate in opposite directions with relation to each other, longitudinally of the said saw passage, and are provided with shanks lying beneath the saw blade for the major portion of their length and, near the ends of said passage, diverging from their course and rising to form fingers 13$^b$ and 13$^c$, respectively, close by the edge of the saw blade and in the horizontal plane thereof. Said pawls are held in normal engagement with said teeth by the thrust rods 14 and 14$^a$, which are operated by the springs 14$^b$ and 14$^c$, respectively. Said rods are pivoted at their inner ends to said pawls respectively and are provided at their outer ends with finger-holds 14$^d$ and lugs 14$^e$, by which finger-holds they may be retracted and swing so as to engage said lugs with shoulders 1$^c$ formed upon the said body frame, thus withdrawing said pawls from engagement with said wheel 11$^a$ and stopping the cross-wise feed of the engine base and web plate and saw. The saw blade, A, is blank, without teeth, throughout that portion of its length which extends through said saw passage at any period of the reciprocation of the saw, but intermediate of the ends of that portion of the saw which, in operation, always remains within said saw passage there are formed on opposite edges thereof transversely extending shoulders 15 and 15$^a$, respectively, which shoulder 15 is adapted shortly before the completion of the forward stroke of the saw, to strike the finger 13$^b$, and carry it forward, thus operating the pawl 13. Upon the return stroke of said saw, said shoulder 15$^a$ strikes the finger 13$^c$ near the rear end of the saw passage and carries it to the rear, thus operating the pawl 13$^a$. Both of said pawls are returned by suitable springs, as 16. Upon said cylinder base is positioned a reciprocating engine 17, of any suitable construction, which, it is thought need not be here more specifically described, many engines suitable for the purpose being well known to the art. Extending rearwardly from the power cylinder 17 of said engine is the piston rod 17$^a$, from which piston rod depends a foot or bracket, 18, which is rigidly secured thereto, and to which bracket is secured the rearward end or heel of the saw-blade, A. The path of the outer end of said piston rod is preferably protected by an approximately cylindrical hood, or relatively stationary sleeve 19, open along its under side only sufficiently to permit of the passage and reciprocation of said foot. Pivoted to the forward end of said body frame, at opposite sides thereof are legs 20, to the lower ends of which are pivoted the forward ends of telescopic braces 21, the upper ends of which braces are pivoted to said body frame intermediate of the ends of the sides thereof. The respective members of each of said telescopic braces are held in extended position by any suitable means, as by a set screw 21$^a$. These legs and braces thus form a bracket adapted to bear against the side of a tree and to hold up the rear end of the machine when it is not desired to have it rest upon the ground.

In operation, the saw is first swung to the left of the standing tree or stump, or above a reclining log, as the case may be, the machine being turned on its edge X if it is to be used to saw a recumbent log. The chain is then carried around the tree or log and the free end of the chain is engaged by the locking lever 6. The screw is then rotated in the proper direction to draw back the locking lever carriage 5, so as to tighten the chain and draw the teeth into the tree or log. The bracket may at the time be extended more or less to support the rear end of the frame, or it may be collapsed, by retracting the set screws and permitting the braces to telescope approximately their full length, depending on whether the rear end of the machine requires to be supported above the ground, or not.

The pawls may be retracted and the cylinder base and web plate may be manually moved transversely of the body frame to adjust the engine, in the first instance, to a desired position, or with respect to the tree or log without swinging the engine on its axis, or in addition to so swinging it; or the pawls may be released and permitted to engage the ratchet wheel 11$^a$, in which event each reciprocation of the saw blade will, through the medium of the pawls and spring dogs 12$^a$ and 12$^b$ result in actuating the ratchet wheels 11$^a$ and 10$^a$ and the gear wheel 10$^c$ the width of one tooth, thus automatically feeding the engine and saw transversely of the frame. While such automatic feed is in operation, the rear end of the engine will be controlled manually through the medium of said hood 19, either to prevent said rear end from swinging, or from swinging too fast, or to either modify or accelerate the feed of the saw by swinging the engine on its pivot while said engine is being automatically fed transversely of said frame.

I am aware that many attempts have been made to devise a practical machine for sawing down standing trees or cutting up recumbent logs, and that both transversely movable engines and pivotally movable engines have been devised for such purpose and are old in the art; but these, so far as I know them, have had saw guides of considerable length and great inconvenience extending forward of the cylinder, rendering the machine less compact and rigid and less easy to transport and to adjust, and more difficult to hastily remove from danger of falling trees. I am not aware either of any machine in which the transverse movement of the engine and saw is accomplished as in my invention automatically, in part by the saw during its reciprocation.

The engine is supplied with motive power from any suitable source of supply, and by any suitable conduit, forming no part, *per se*, of this my invention.

It is obvious that said construction may within the scope of certain of my claims be modified in various details by substituting therefor equivalents responsive to such of said claims, or by transposing certain parts, or by varying their dimensions or proportions.

What I claim is—

1. In a drag saw machine, the combination of a body frame, a transversely reciprocable web plate mounted thereon and engaged thereby, an engine base pivotally mounted on said web plate, said engine base having a longitudinally directed saw blade passage formed therethrough, a saw blade directed through said passage and projecting out of each end of the same, a reciprocating engine mounted on said engine base and over said passage and extending longitudinally of said base and provided with a rearwardly directed piston rod, means for connecting the rearward end of said saw blade to the outer end of said piston rod, means for reciprocating said engine base and web plate transversely of said frame, means adapted to be automatically actuated by said saw blade for operating said base reciprocating means, and means for holding the forward end of said frame firmly against the object from which a portion of material is to be sawed.

2. In a drag saw machine, the combination of a body frame, a transversely reciprocatable web plate mounted thereon and engaged thereby, an engine base pivotally mounted on said web plate, said engine base having a saw blade passage formed therein and extending longitudinally thereof, a saw blade extending through said passage and extending forwardly and rearwardly thereof, an engine carried by said engine base, said engine being positioned over said passage means for connecting said engine with the rearward end of said saw, said engine and connecting means being adapted to reciprocate said saw blade, means for reciprocating said web plate transversely of said frame, and means for holding the forward end of said frame firmly against an object from which a portion is to be sawed.

3. In a drag saw machine, the combination of a body frame, an oscillatable engine base having a longitudinally extending saw blade passage formed therethrough and extending longitudinally thereof, a power cylinder mounted on said base and extending over said passage, a reciprocatable saw blade extending through and beyond said passage in opposite directions and means connecting said engine with the rearward end of said saw blade for reciprocating the same.

4. In a drag saw, the combination of a body frame, an engine carried thereby, a reciprocatable saw, means connecting said engine with said saw for reciprocating the same, adjustable means for bracketing said frame against the side of an object to be sawed, and means for holding said frame firmly against the object to be sawed.

5. In a drag saw machine, the combination of a body frame, provided with a transversely extending row of forwardly directed teeth at its forward end for engaging the object to be sawed, flexible means secured at one end to the forward end of one side of said frame and adapted to embrace the object to be sawed, a reciprocating carriage mounted on the opposite side of said frame, a lever mounted on said carriage and adapted to engage said flexible means, means for securing said lever in operative position and a rotatable screw mounted on said frame and engaging said carriage and adapted to reciprocate the same.

6. In a drag saw machine, the combination of a body frame, a transversely reciprocable web plate mounted thereon and engaged thereby, an engine base pivotally mounted on said plate, an engine mounted on said base, a reciprocable saw connected to said engine, a transversely extending rack bar formed on or secured to said frame, a gear wheel carried by said plate and engaging said rack bar and adapted to reciprocate said plate, means carried by said plate for rotating said gear, and a saw blade carried by said engine base and adapted to actuate the means for rotating said gear.

7. In a drag saw machine, the combination of a body frame, a transversely reciprocable web plate mounted thereon, a rack bar extending transversely of said frame beneath said web plate, an engine base pivotally mounted on said web plate and having a longitudinally directed saw blade passage extending therethrough and across the pivotal axis thereof, driving mechanism engaging said rack bar and concentric with the pivotal axis of said web plate and extending into said saw blade passage for reciprocating said web plate, a saw blade extending into said passage and above said driving mechanism, operating means engaging said driving mechanism for operating the same, said saw being provided with actuating means adapted to engage said operating means to actuate the same, and an engine carried by said engine base and connected to said saw and adapted to reciprocate the same.

8. In a drag machine, the combination of a body frame, an engine mounted thereon, a reciprocatable saw secured to said engine and adapted to be actuated thereby, a bracket secured to said frame for supporting the same upon the body to be sawed, said bracket comprising legs secured at one end to said frame and at other points to extensible braces, said braces extending rearwardly and upwardly toward said frame, and means for securing said braces in their adjusted position.

9. In a drag saw machine, the combination of a body frame, a transversely reciprocatable plate mounted thereon and engaged thereby, an engine base pivotally mounted on said plate, an engine mounted on said base, a reciprocatable saw connected to said engine and adapted to be actuated thereby, a transversely extending rack bar formed on or secured to said frame, a gear wheel carried by said plate and concentric with the pivot of said engine and engaging said rack bar and adapted to reciprocate said plate, means carried by said plate for rotating said gear, and a saw blade carried by said engine base and adapted to actuate the means for rotating said gear.

In testimony whereof I hereunto affix my signature, in presence of two witnesses.

ROBERT J. McGHEE.

Witnesses:
JAMES T. WATSON,
W. J. HOLMES.